Sept. 16, 1952  A. SCHUETTPELZ  2,610,881
VEHICLE BUMPER
Filed April 2, 1948
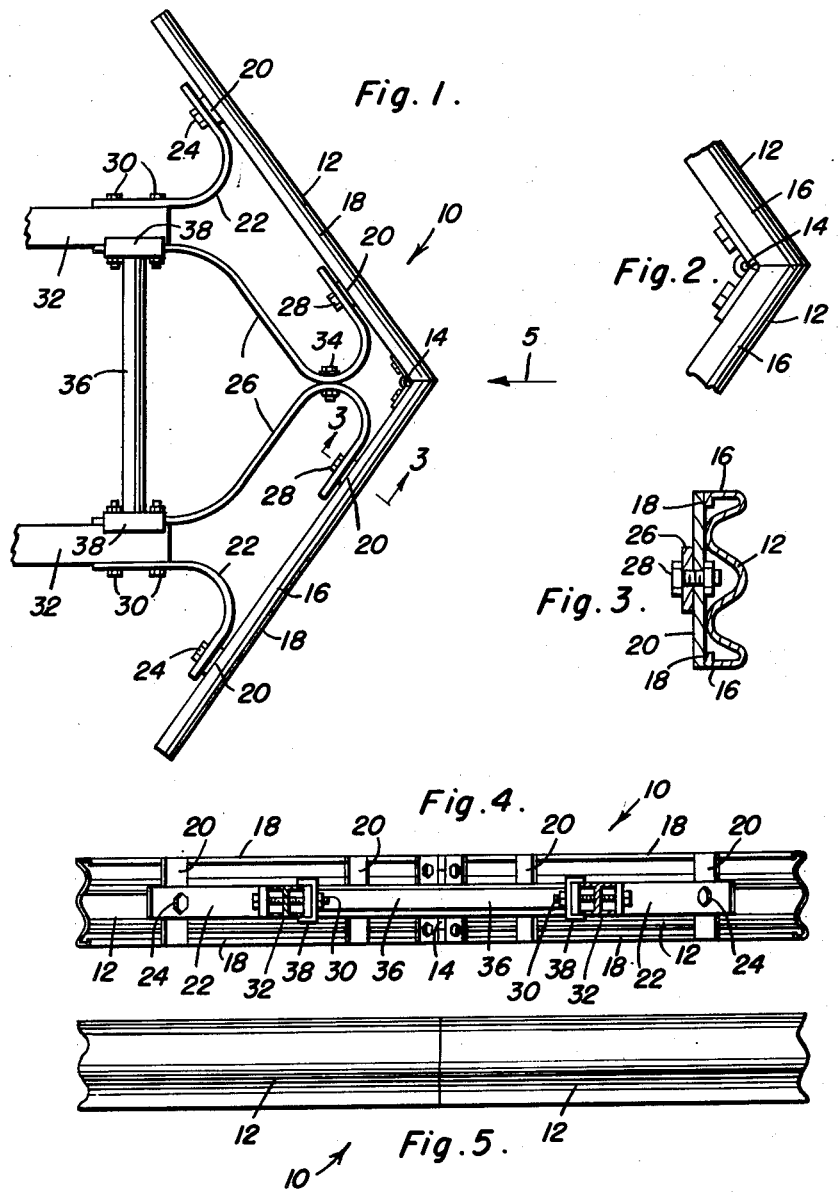
Alfred Schuettpelz
INVENTOR.

Patented Sept. 16, 1952

2,610,881

UNITED STATES PATENT OFFICE 2,610,881

VEHICLE BUMPER

Alfred Schuettpelz, Suring, Wis.

Application April 2, 1948, Serial No. 18,627

1 Claim. (Cl. 293—70)

This invention relates to new and useful improvements and structural refinements in bumpers for vehicles such as automobiles, trucks and the like, and the principal object of the invention is to prevent any possible damage to the body of the vehicle upon collision with some other body.

This object is achieved by the provision of a vehicle bumper which includes a pair of bar sections disposed in V-shaped formation, the two bar sections being hingedly connected together and being resiliently attached to the vehicle frame, thereby tending to divert the full force of the impact to the sides, where it can be most effectively absorbed by the resiliency of the means whereby the bars are attached to the vehicle body, rather than the force of impact being transmitted in line parallel to the longitudinal axis of the vehicle, as occurs when bumpers of conventional type are employed.

An important feature of the invention resides in the provision of bumper bars or bumper bar sections which are corrugated longitudinally, thereby preventing the bumper from attempting to climb over or under an object with which it comes in contact.

An additional feature of the invention resides in the provision of a vehicle bumper which is simple in construction, pleasing in appearance and which may be effectively employed with vehicles of various sizes and types.

A still further feature of the invention resides in the provision of a vehicle bumper which will readily lend itself to economical manufacture and which is otherwise well adapted for the purpose for which it is intended.

With the above more important objects and features in view and such other objects and features as may become apparent as this specification proceeds, the invention consists essentially of the construction and arrangement of parts as shown in the accompanying drawings in which:

Figure 1 is a top plan view of the invention,

Figure 2 is a fragmentary top plan view showing a hinged connection between the bar sections of the bumper, Figure 3 is a cross sectional view, taken substantially in the plane of the line 3—3 in Figure 1, Figure 4 is a rear elevational view of the bumper assembly, and Figure 5 is a front elevational view, taken in the direction of the arrow 5 in Figure 1.

Like characters of reference are employed to designate like parts in the specification and throughout the several views.

Referring now to the accompanying drawings in detail, the invention consists of a bumper designated generally by the reference character 10, the same being intended for mounting either at the front end or the rear end of a vehicle and embodying in its construction a pair of bar sections 12, the cross sectional configuration of which is best shown in the accompanying Figure 3.

It is to be noted that the sections 12 are normally disposed in a V-shaped formation, and are secured together at the adjacent ends thereof by means of a suitable hinge 14. It is also to be noted that the bar sections 12 are corrugated in cross sectional configuration, the upper and lower longitudinal edges 16 of the bar sections terminating in inturned flanges 18, to which are welded, or otherwise suitably secured, transversely extending straps 20.

A pair of resilient outer arms 22, configurated substantially as shown, are secured at one end as at 24 to the straps 20 adjacent the outer, divergent ends of the bars 12, while a pair of resilient inner arms 26, configurated as is best shown in Figure 1, are similarly secured as at 28 to the straps 20 adjacent the hinge 14. It is to be noted that the arms 22, 26 are arcuated so as to substantially enhance their inherent resiliency, and the free end portion of the two sets of arms are secured as at 30 to the side members 32 of the vehicle frame.

Moreover, the inner arms 26 are secured together by means of a bolt 34, and a rigid tie-rod 36, equipped at the ends thereof with U-shaped bolting plates 38, extends between the frame members 32, being secured thereto by means of the aforementioned fastening means 30, as is best shown in Figure 1.

The purpose of the tie-rod 36 is, of course, to reinforce the frame members 32, and when the invention is placed in use, the force of any impact sustained by the bumper will be diverted laterally by the V-shaped divergent bar sections 12 to the sides of the bumper assembly, where such force can best be absorbed by the inherent resiliency of the arms 22, 26.

Moreover, it is to be noted that inasmuch as the bumper sections 12 are corrugated longitudinally, they provide what may be referred to as longitudinally extending grooves, whereby if the bumper encounters a foreign object, the longitudinal grooves thereof will prevent the bumper from attempting to climb over or under such object and thereby prevent overturning of the vehicle on which the bumper is mounted.

Needless to say, the bumper constructed in accordance with the teachings of the invention may be attached either to the front or to the back, as well as to both front and back of the vehicle, with which it is to be used.

It is believed that the advantages and use of the invention will be clearly understood from the foregoing disclosure, and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In a vehicle bumper, the combination of a horizontal bar formed from one piece of material and provided with longitudinal corrugations affording a vertical series of alternately concave grooves and convex ribs on the front face of the bar, said bar having vertically opposed top and bottom flat plate portions, integral flanges extending downwardly from the rear edge of the top plate portion and upwardly from the rear edge of the bottom plate portion, spaced vertical straps extending transversely of the bar and abutting the rear faces of said flanges and the rearmost portions of said corrugations, ends of said straps being secured to said flanges, and bumper mounting elements secured to intermediate portions of the straps.

ALFRED SCHUETTPELZ.

REFERENCES CITED

The following references are of record in the file of this patent:

UNITED STATES PATENTS

| Number | Name | Date |
|---|---|---|
| 1,423,187 | Caplan | July 18, 1922 |
| 1,440,081 | Hutchings | Dec. 26, 1922 |
| 1,485,332 | Edwards | Feb. 26, 1924 |
| 1,509,394 | Cox | Sept. 23, 1924 |
| 1,901,227 | Cossalter | Mar. 14, 1933 |
| 2,078,679 | Golphin | Apr. 27, 1937 |
| 2,147,745 | MacKinnon | Feb. 21, 1939 |
| 2,159,651 | Brockett | May 23, 1939 |
| 2,508,836 | Morris | May 23, 1950 |